United States Patent [19]

Denker et al.

[11] Patent Number: 5,058,179
[45] Date of Patent: Oct. 15, 1991

[54] HIERARCHICAL CONSTRAINED AUTOMATIC LEARNING NETWORK FOR CHARACTER RECOGNITION

[75] Inventors: John S. Denker, Leonardo; Richard E. Howard, Highland Park; Lawrence D. Jackel, Holmdel; Yann LeCun, Middletown, all of N.J.

[73] Assignee: AT&T Bell Laboratories, Murray Hill, N.J.

[21] Appl. No.: 472,991

[22] Filed: Jan. 31, 1990

[51] Int. Cl.$^5$ .............................................. G06K 9/66
[52] U.S. Cl. ........................................ 382/14; 382/49
[58] Field of Search ............................ 382/14, 10, 49; 364/513, 274.9, 276.6

[56] References Cited

U.S. PATENT DOCUMENTS

| | | | |
|---|---|---|---|
| 3,275,986 | 9/1966 | Dunn et al. | 340/146.3 |
| 3,295,103 | 12/1966 | Driese et al. | 340/146.3 |
| 3,701,095 | 10/1972 | Yamaguchi et al. | 340/146.3 MA |
| 4,750,211 | 6/1988 | Wray | 382/41 |
| 4,918,742 | 4/1990 | Simonds | 382/41 |
| 4,933,872 | 6/1990 | Vandenberg et al. | 364/513 |

OTHER PUBLICATIONS

D. E. Rumelhart et al., Parallel Distr. Proc.: Explorations in Microstructure of Cognition, vol. 1, 1986, "Learning Internal Representations by Error Propagation", pp. 318–362.

R. P. Lippmann, IEEE ASSP Magazine, vol. 4, No. 2, Apr. 1987, "An Introduction to Computing with Neural Nets", pp. 4–22.

Y. LeCun, Connectionism in Perspective, R. Pfeifer, Z. Schreter, F. Fogelman, L. Steels (Eds.), 1989, "Generalization and Network Design Strategies", pp. 143–155.

Y. LeCun et al., IEEE Comm. Magazine, Nov. 1989, "Handwritten Digit Recognition: Applications of Neural . . . ", pp. 41–46.

Primary Examiner—Leo H. Boudreau
Assistant Examiner—Andrew W. Johns
Attorney, Agent, or Firm—Gregory C. Ranieri

[57] ABSTRACT

Highly accurate, reliable optical character recognition is afforded by a hierarchically layered network having several layers of parallel constrained feature detection for localized feature extraction followed by several fully connected layers for dimensionality reduction. Character classification is also performed in the ultimate fully connected layer. Each layer of parallel constrained feature detection comprises a plurality of constrained feature maps and a corresponding plurality of kernels wherein a predetermined kernel is directly related to a single constrained feature map. Undersampling is performed from layer to layer.

14 Claims, 15 Drawing Sheets

HIERARCHICAL CONSTRAINED AUTOMATIC LEARNING NETWORK FOR CHARACTER RECOGNITION

CROSS-REFERENCE TO RELATED APPLICATION

This application is related to U.S. patent application Ser. No. 444,455 filed Nov. 30, 1989 and commonly assigned herewith.

TECHNICAL FIELD

This invention relates to the field of pattern recognition and, more particularly, to massively parallel, constrained networks for optical character recognition.

BACKGROUND OF THE INVENTION

Computation systems based upon adaptive learning with fine-grained parallel architectures have moved out of obscurity in recent years because of the growth of computer-based information gathering, handling, manipulation, storage, and transmission. Many concepts applied in these systems represent potentially efficient approaches to solving problems such as providing automatic recognition, analysis and classification of character patterns in a particular image. Ultimately, the value of these techniques in such systems depends on their effectiveness or accuracy relative to conventional approaches.

In a recent article by Y. LeCun entitled "Generalization and Network Design Strategies," appearing in *Connectionism in Perspective*, pp. 143-155 (Elsevier Science Publishers: North-Holland 1989), the author describes five different layered network architectures applied to the problem of optical digit recognition. Learning in each of the networks was attempted on pixel images of handwritten digits via inherent classification intelligence acquired from the backpropagation technique described by D. Rumelhart et al., *Parallel Distributed Processing*, Vol. I, pp. 318-362 (Bradford Books: Cambridge, Mass. 1986). Complexity of the networks was shown to increase from a two layer, fully connected network called Net-2 to a hierarchical network called Net-5 having two levels of constrained feature maps for hierarchical feature extraction. The network Net-2 was said to have a significantly larger standard deviation in generalization performance than single layer, fully connected networks indicating, thereby, that the former network is largely undetermined with a large number of solutions consistent with its training set. But, as stated by LeCun, "[u]nfortunately, these various solutions do not give equivalent results on the test set, thereby explaining the large variations in generalization performance . . . it is quite clear that the network is too big (or has too many degrees of freedom)." Performance of the most complex hierarchical network, that is, Net-5, exceeded that of the lesser complex networks. Moreover, it was postulated that the multiple levels of constrained feature maps provided additional control for shift invariance.

While the hierarchical network described above appears to have advanced the art of solving the character recognition or classification problem, it is equally apparent that existing systems lack sufficient accuracy to permit realization of reliable automatic character recognition apparatus.

SUMMARY OF THE INVENTION

Highly accurate, reliable optical character recognition is afforded by a hierarchically layered network having several layers of parallel constrained feature detection for localized feature extraction followed by several fully connected layers for dimensionality reduction. Character classification is also performed in the ultimate fully connected layer. Each layer of parallel constrained feature detection comprises a plurality of constrained feature maps and a corresponding plurality of kernels wherein a predetermined kernel is directly related to a single constrained feature map. Undersampling occurs from layer to layer.

In an embodiment according to the principles of the invention, the hierarchical network comprises two layers of constrained feature detection followed by two fully connected layers of dimensionality reduction. Each constrained feature map comprises a plurality of units. Units in each constrained feature map of the first constrained feature detection layer respond as a function of both the corresponding kernel for the constrained feature map and different portions of the pixel image of the character captured in a receptive field associated with the unit. Units in each feature map of the second constrained feature detection layer respond as a function of both the corresponding kernel for the constrained feature map and different portions of an individual constrained feature map or a combination of several constrained feature maps in the first constrained feature detection layer as captured in a receptive field of the unit. Feature maps of the second constrained feature detection layer are fully connected to each unit in the first dimensionality reduction layer. Units in the first dimensionality reduction layer are fully connected to each unit of the second dimensionality reduction layer for final character classification. Kernels are automatically learned by constrained back propagation during network initialization or training.

Benefits realized from this network architecture are increased shift invariance and reduced entropy, Vapnik-Chervonenkis dimensionality and number of free parameters. As a result of these improvements, the network experiences a proportional reduction in the amount of training data and training time required to achieve a given level of generalization performance.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
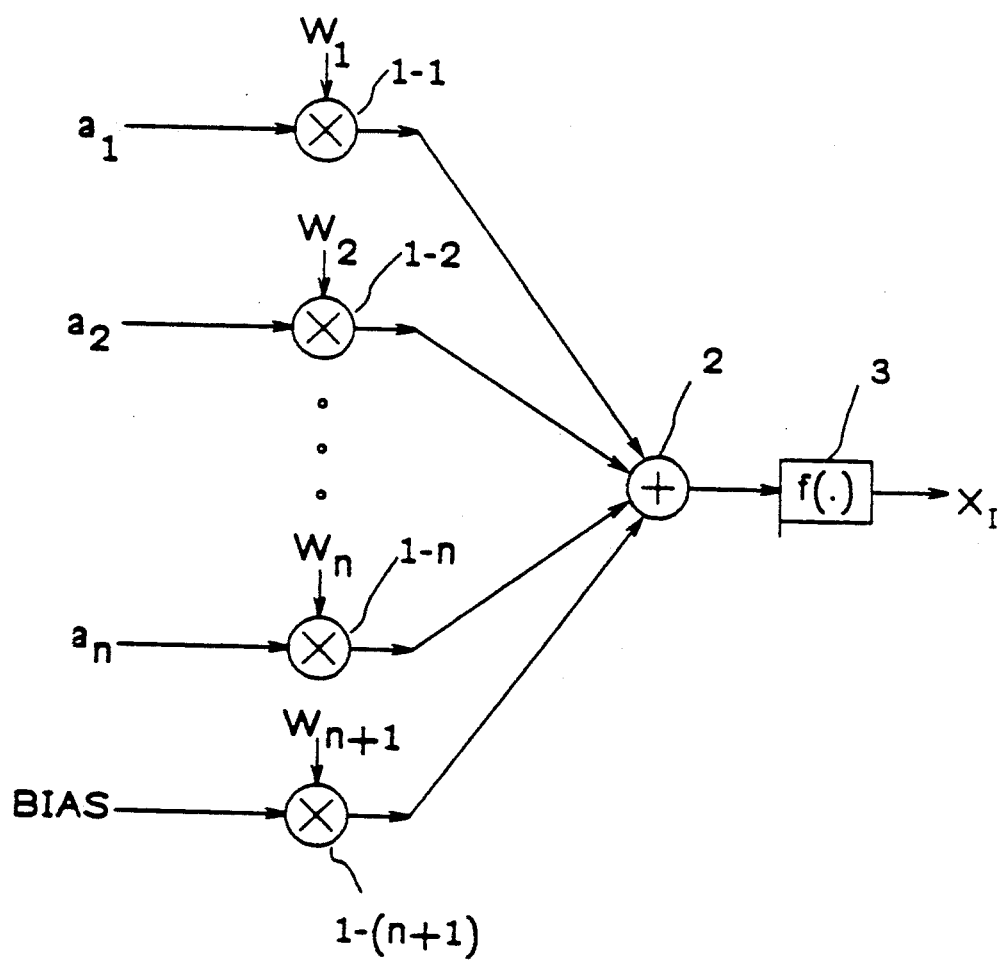
FIG. 1 is a simplified block diagram for each individual computational element in the network.

Computational elements as shown in FIG. 1 form the fundamental functional and interconnectionist blocks for a hierarchical constrained network realized in accordance with the principles of the invention. In general, a computational element forms a weighted sum of input values for n+1 inputs and passes the result through a nonlinearity to arrive at a single value. The input and output values for the computational element may be analog, quasi-analog such as multi-level and gray scale, or binary in nature. Nonlinearities commonly employed in computational elements include hard limiters, threshold logic elements, sigmoidal nonlinearities, and piecewise nonlinear approximations, for example.

In operation, the computational element shown in FIG. 1 scans n neighboring input pixels, pixel values or unit values from an image or feature map wherein the pixels, pixel values and unit values have values such as brightness levels represented as $a_1, a_2 \ldots, a_n$. An input bias is supplied to the n+1 input of a computational element. For simplicity, the bias is generally set to a constant value such as 1. The input values and the bias are supplied to multipliers 1-1 through 1-(n+1). The multipliers also accept input from a kernel having weights $w_1$ through $W_{n+1}$. Outputs from all multipliers are supplied to adder 2 which generates the weighted sum of the input values. As such, the output from adder 2 is simply the dot product of a vector of input values (including a bias value) with a vector representing the kernel of weights. The output value from adder 2 is passed through the nonlinear function in nonlinearity 3 to generate a single unit output value $x_i$. As will be understood more clearly below, unit output value $x_i$ is related to the value of the $i^{th}$ unit in the feature map under consideration.

In an example from experimental practice, an exemplary sigmoidal function for nonlinearity 3 is chosen as a scaled hyperbolic tangent function, $f(a) = A \tanh Sa$ where $a$ is the weighted sum input to the nonlinearity, A is the amplitude of the function, and S determines the slope of the function at the origin. The exemplary nonlinearity is an odd function with horizontal asymptotes at +A and −A. It is understood that nonlinear functions exhibiting an odd symmetry are believed to yield faster convergence of the kernel weights $w_1$ through $w_{n+1}$.

Weights for each of the kernels in the hierarchical constrained network were obtained using a trial and error learning technique known as back propagation. See the Rumelhart et al. reference cited above or see R. P. Lippmann, "An Introduction to Computing with Neural Nets", *IEEE ASSP Magazine*, Vol. 4, No. 2, pp. 4-22 (1987). Prior to training, each weight in the kernel is initialized to a random value using a uniform distribution between, for example, $-2.4/F_i$ and $2.4/F_i$ where $F_i$ is the number of inputs (fan-in) of the unit to which the connection belongs. For the example shown in FIG. 1, the fan-in $F_i$ is equal to n+1. An exemplary output cost function is the well known mean squared error function:

$$MSE = \frac{1}{OP} \sum_p \sum_o \frac{1}{2} (d_{op} - x_{op})^2$$

where P is the number of patterns, O is the number of output units, $d_{op}$ is the desired state for output unit o when pattern p is presented, and $x_{op}$ is the state for output unit o when pattern p is presented, By using this initialization technique, it is possible to maintain values within the operating range of the sigmoid nonlinearity. During training, image patterns are presented in a constant order. Weights are updated according to the stochastic gradient or "on-line" procedure after each presentation of a single image pattern for recognition. A true gradient procedure may be employed for updating so that averaging takes place over the entire training set before weights are updated. It is understood that the stochastic gradient is found to cause weights to converge faster than the true gradient especially for large, redundant image data bases. A variation of the Back-Propagation algorithm computes a diagonal approximation the the Hessian matrix to set the learning rate optimally. Such a "pseudo-Newton" procedure produces a reliable result without requiring extensive adjustments of parameters. See Y. LeCun, *Modeles Connexionnistes de l'Apprentissage*, PhD Thesis, Universite Pierre et Marie Curie, Paris, France (1987).

Standard techniques are employed to convert a handwritten character to the pixel array which forms the supplied character image. The character image may be obtained through electronic transmission from a remote location or it may be obtained locally with a scanning camera or other scanning device. Regardless of its source and in accordance with conventional practice, the character image is represented by an ordered collection of pixels. The ordered collection is typically an array. Once represented, the character image is generally captured and stored in an optical memory device or an electronic memory device such as a frame buffer.

Each pixel has a value associated therewith which corresponds to the light intensity or color or the like emanating from that small area on the visual character image. Values of the pixels are then stored in the memory devices. When reference is made to a particular map, it is understood that the terms "pixel" and "unit value(s)" are used interchangeably and include pixels, pixel values and unit values output from each computation element combining to form the map array. It may be more convenient to think in terms of planes or 2-dimensional arrays (maps) of pixels rather than pixel values or unit values for visualizing and developing an understanding of network operation.

Figure 7:
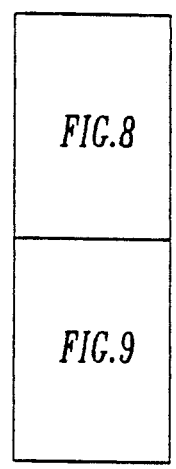
Figure 10:
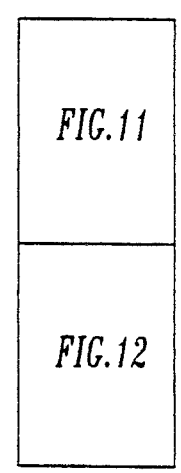
Figure 13:
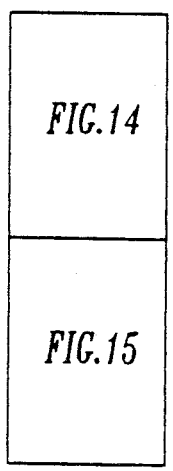
Figure 16:
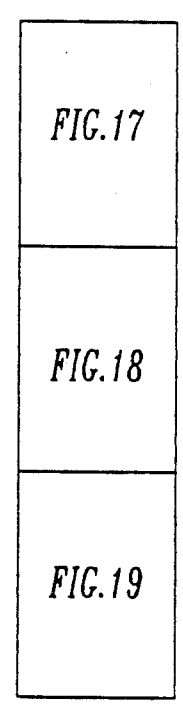

In addition to visualizing pixel and unit values with pixel intensity levels, it is also useful to visualize the array of weights in the kernel in this manner. See, for example, FIG. 7 which represent arrays of kernels learned during an experiment with the network embodiment in FIG. 2. Also, by visualizing the kernel as an array, it is possible to understand more easily how and what the kernel affects in the pixel array undergoing feature extraction.

Various other preprocessing techniques used to prepare a character image as a pixel array for character recognition may include various linear transformations, such as scaling, size normalization, deskewing, centering, and translation or shifting, all of which are well known to those skilled in the art. In addition, transformation from the handwritten character to a gray scale pixel array may be desirable to preserve information which would otherwise be irretrievably lost during preprocessing. The latter transformation is understood to be well known to those skilled in the art.

In addition to the operations listed above for preparation of the image for character recognition, it is generally desirable to provide a uniform, substantially constant level border around the original image. Such a border is shown in array 102 wherein the array elements outside array 101 in image 10 constitute the uniform border. In the example described below, the input to the network is a 16 by 16 gray-scale image that is formed by normalizing the raw image. The image is gray-scale rather than binary since a variable number of pixels in the raw image can fall into a given pixel in the normalized image.

Realization of the computational elements and, for that matter, the entire network may be in hardware or software or some convenient combination of hardware and software. Much of the network presented herein has been implemented using a SUN workstation with simple programs performing the rudimentary mathematical operations of addition, subtraction, multiplication, and comparison. Pipelined devices, microprocessors, and special purpose digital signal processors also provide convenient architectures for realizing the network in accordance with the principles of the invention. MOS VLSI technology has also been employed to implement particular weighted interconnection networks of the type shown in FIG. 2. Local memory is desirable to store pixel and unit values and other temporary computation results.

Figure 2:
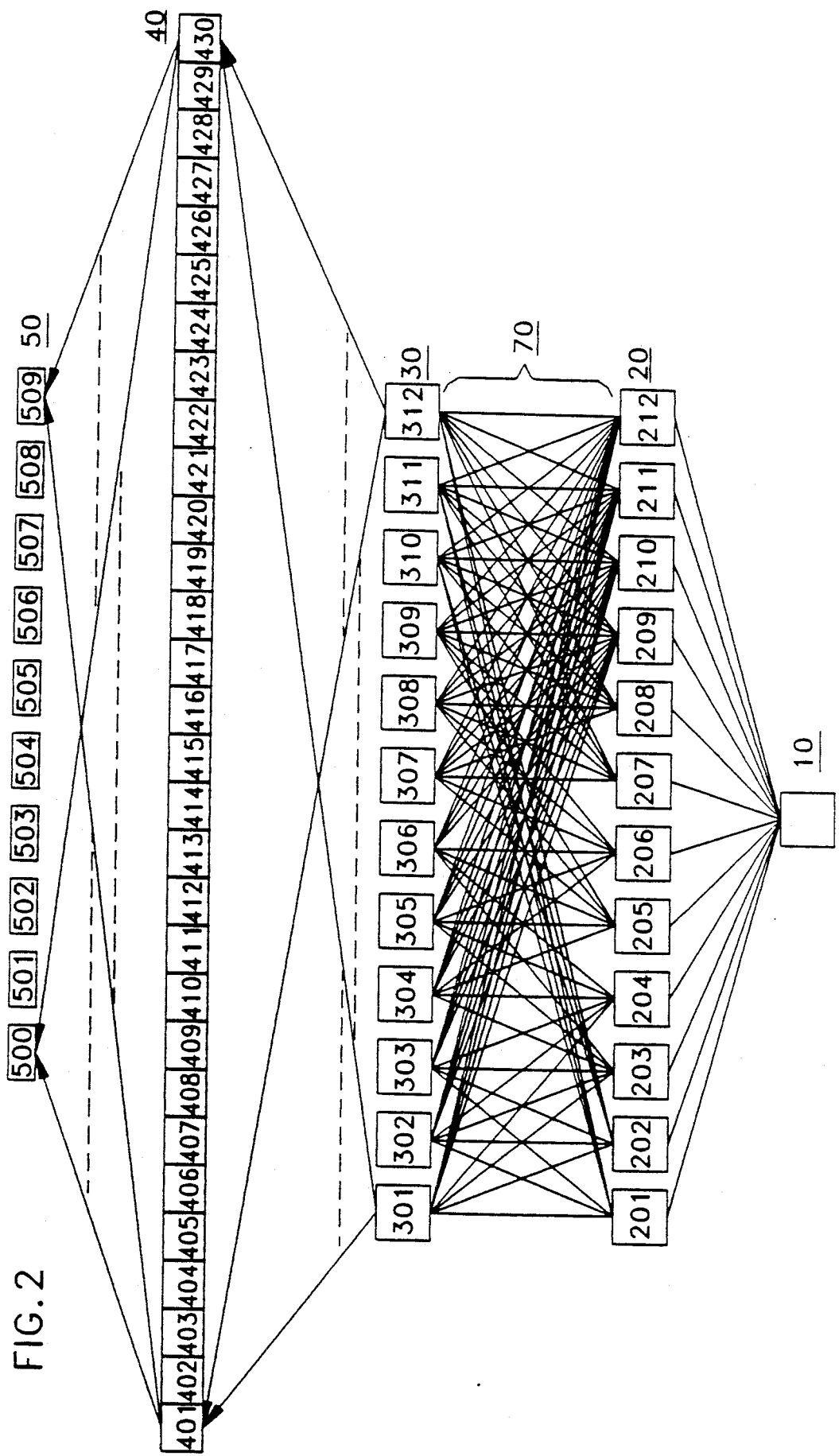
FIG. 2 is a simplified block diagram of an exemplary hierarchical constrained automatic learning network in accordance with the principles of the invention.

FIG. 2 shows a simplified block diagram of an exemplary embodiment for a hierarchical constrained automatic learning network in accordance with the principles of the invention. The network performs character recognition from a supplied image via massively parallel computations. Each array shown shown as a box in the FIG. in layers 20 through 50 is understood to comprise a plurality of computational elements, one per array unit. All of the connections in the network are adaptive, although heavily constrained, and are trained using Back-Propagation. In addition to the input and output layer, the network has three hidden layers respectively named layer 20, layer 30 and layer 40. Connections entering layer 20 and layer 30 are local and are heavily constrained.

The exemplary network shown in FIG. 2 comprises first and second feature detection layers and first and second dimensionality reduction layers, wherein the latter dimensionality reduction layer is a character classification layer. Each layer comprises one or more feature maps or arrays of varying size. In most conventional applications, the maps are square. However, rectangular and other symmetric and non-symmetric or irregular map patterns are contemplated. The arrangement of detected features is referred to as a map because an array is constructed in the memory device where the pixels (unit values) are stored and feature detections from one lower level map are placed in the appropriate locations in the array for that map. As such, the presence or substantial presence (using gray scale levels) of a feature and its relative location are thus recorded.

The type of feature detected in a map is determined by the kernel being used. It should be noted the kernel contains the weights which multiply the pixel values of the image being scanned in the computation element. In constrained feature maps, the same kernel is used for each unit of the same map. That is, a constrained feature map is a scan of a pixel array representing the non-occurrence or the occurrence of the particular feature defined by the one associated kernel. As such, the term "constrained" is understood to convey the condition that computation elements comprising a particular map are forced to share the same set of kernel weights. This results in the same feature being detected at different locations in an input image. In other words, a constrained feature map provides a representation of the occurrence of the same feature localized in some manner. It is understood that this technique is also known as weight sharing.

For those skilled in the art, it will be understood that the kernel defines a receptive field (e.g., 5 pixels×5 pixels or 2 pixels×2 pixels) on the plane of the image pixels or map units being detected for occurrence the feature defined by the kernel. By placement of the kernel on a pixel array, it is possible to show what pixels are being input to the computation element in the feature map and which unit on the feature map is being activated. The unit being activated corresponds generally to an approximate location of the feature occurrence in the map under detection.

The first feature detection layer includes a plurality of constrained feature maps 20. As shown in the figure, the particular embodiment of the network includes twelve each of the constrained feature maps. The second feature detection layer includes a plurality of constrained feature maps 30. As shown in the figure, the particular embodiment of the network includes twelve each of the constrained feature maps in the second layer.

The two upper layers of the network comprises dimensionality reduction layers 40 and 50 wherein layer 50 is a character classification layer. layer 40 is fully connected to all constrained feature maps of the second feature detection layer. The character classification layer is fully connected to all units in dimensionality reduction layer 40. Layer 50 generates an indication of the character (alphabetic or numeral) recognized by the network from the supplied original image. The term "fully connected" is understood to means that the computation element associated with a pixel in layer 40 receives its input from every pixel or unit included in the preceding layer of maps, that is, layer 30.

Figure 4:
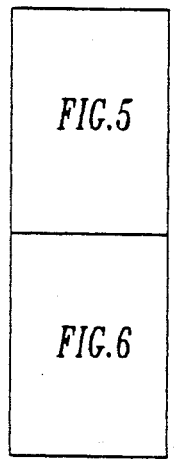
FIGS. 4 through 19 are a collection of exemplary kernel representations utilized in the exemplary network of FIG. 2.
Figure 5:
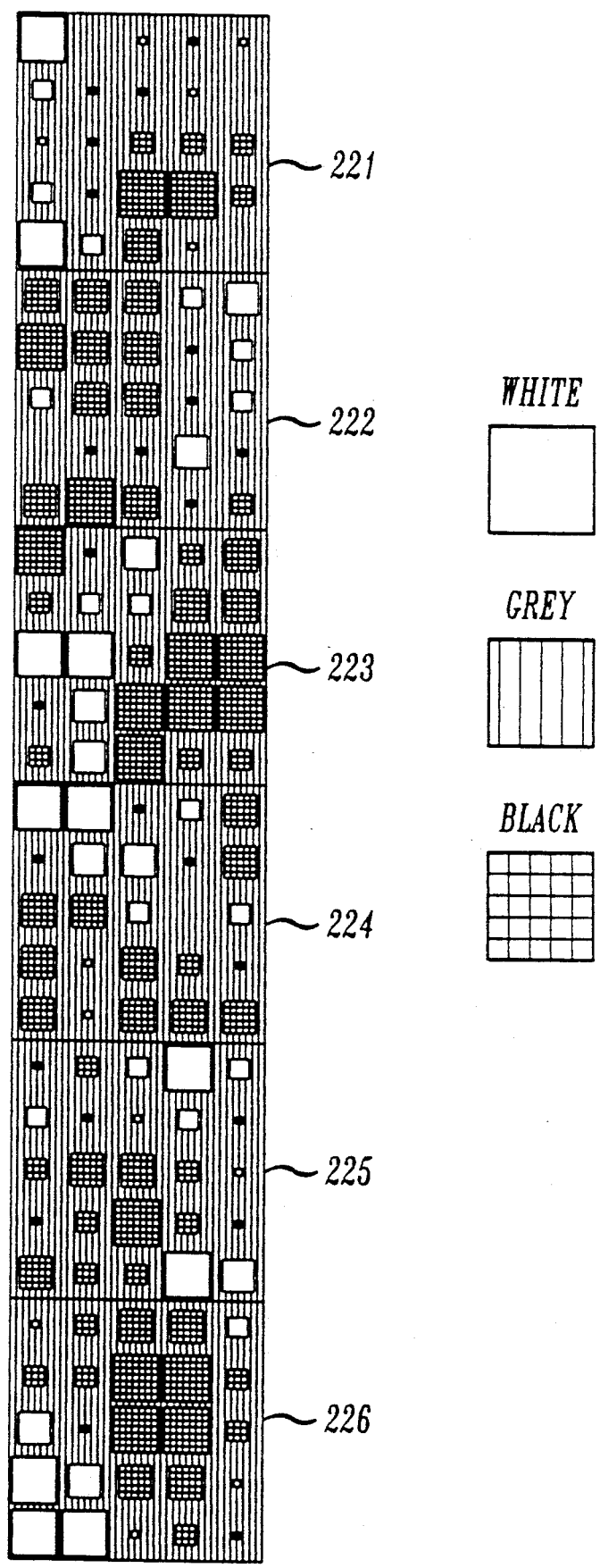
Figure 6:
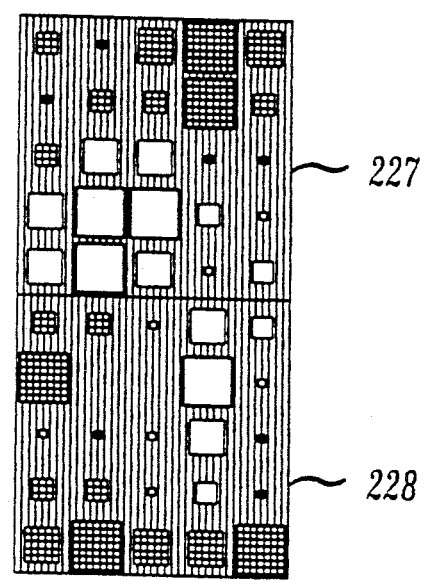
Figure 6:
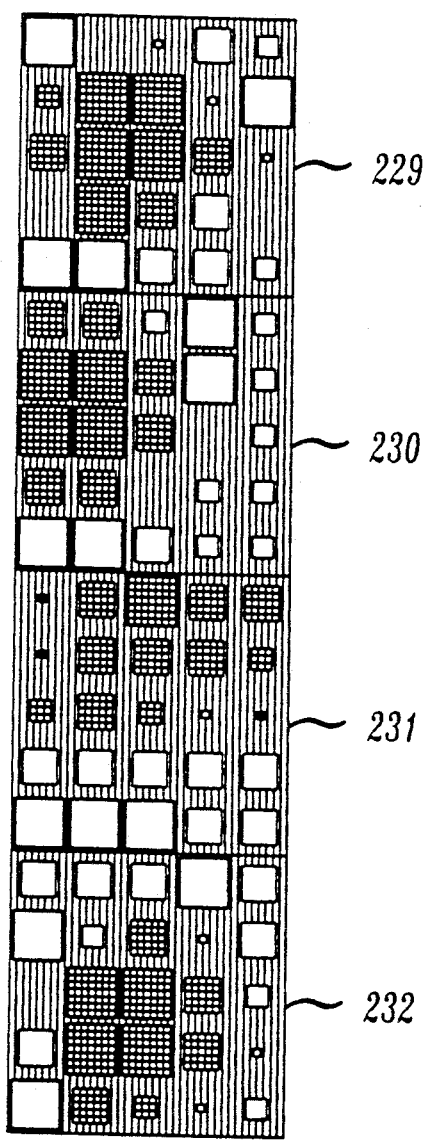
Figure 8:
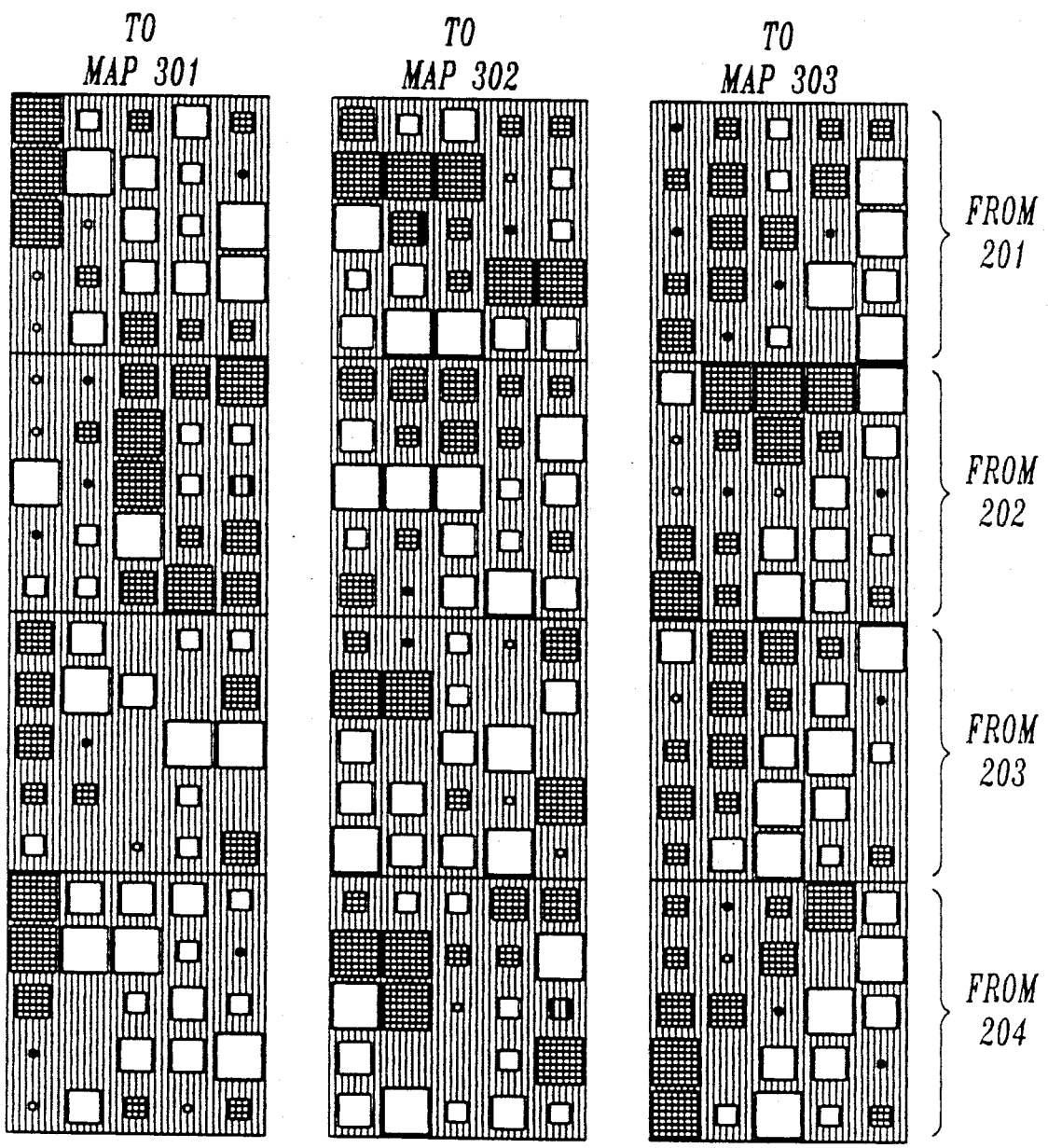
Figure 9:
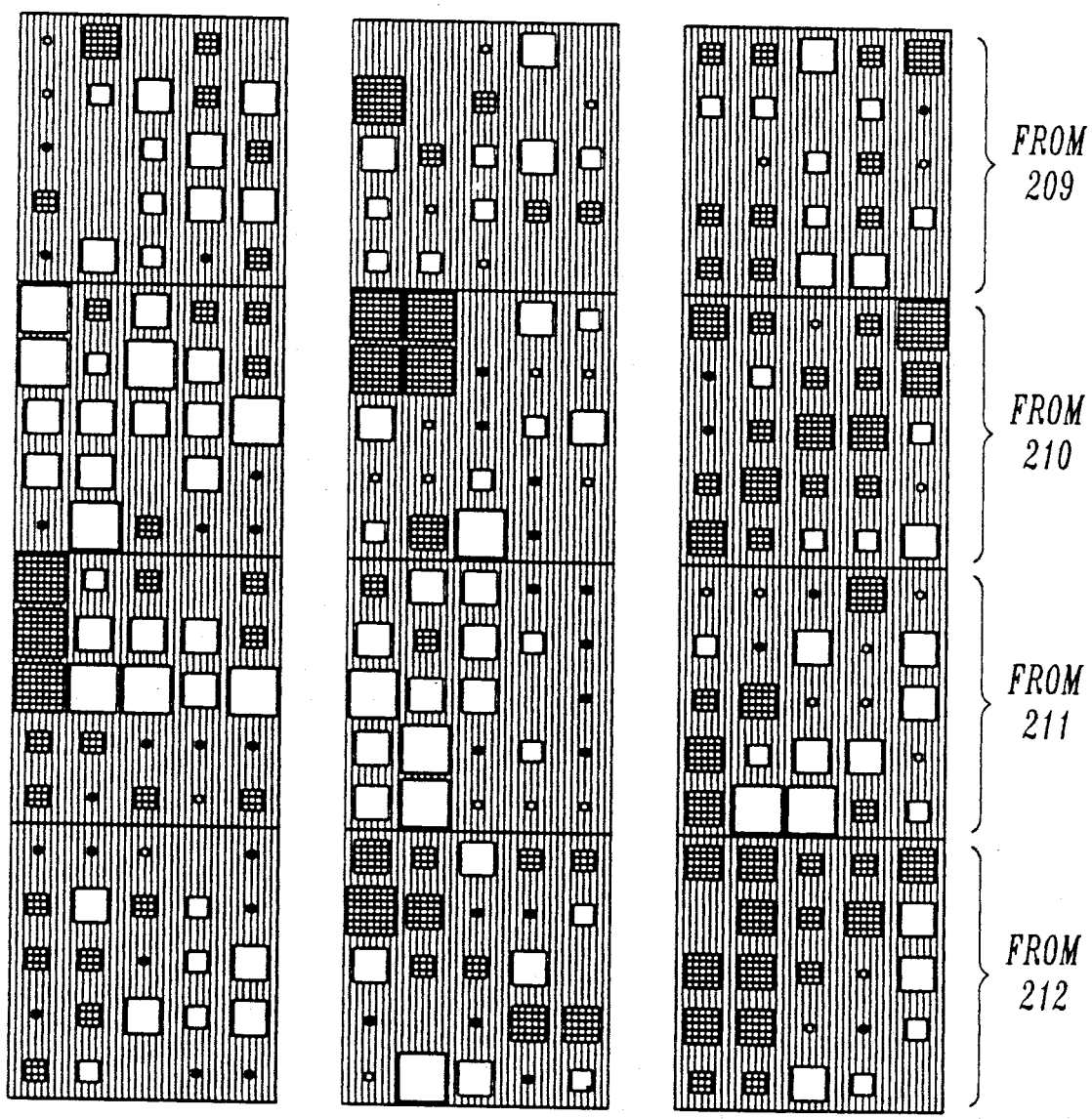
Figure 11:
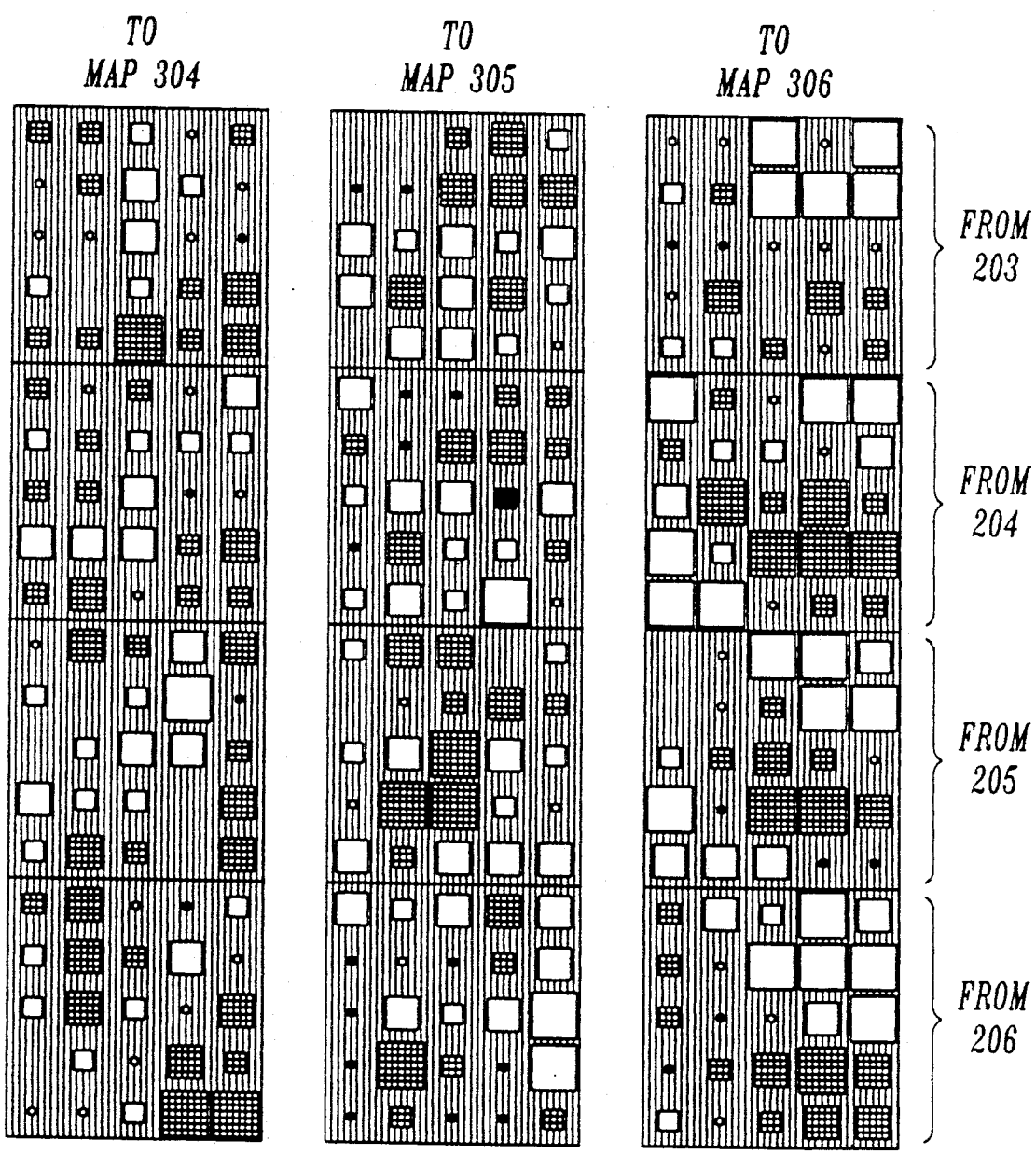
Figure 12:
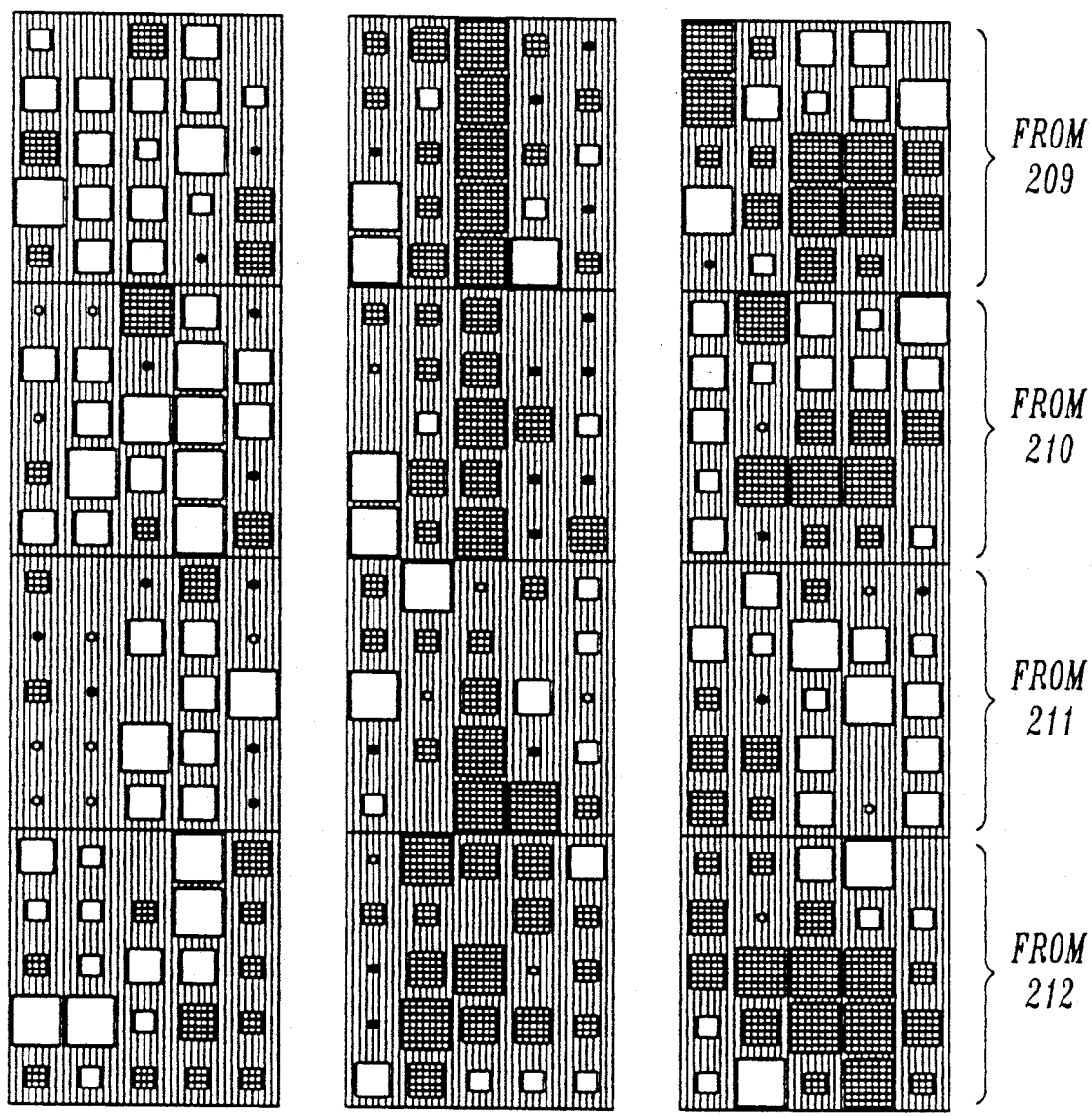
Figure 14:
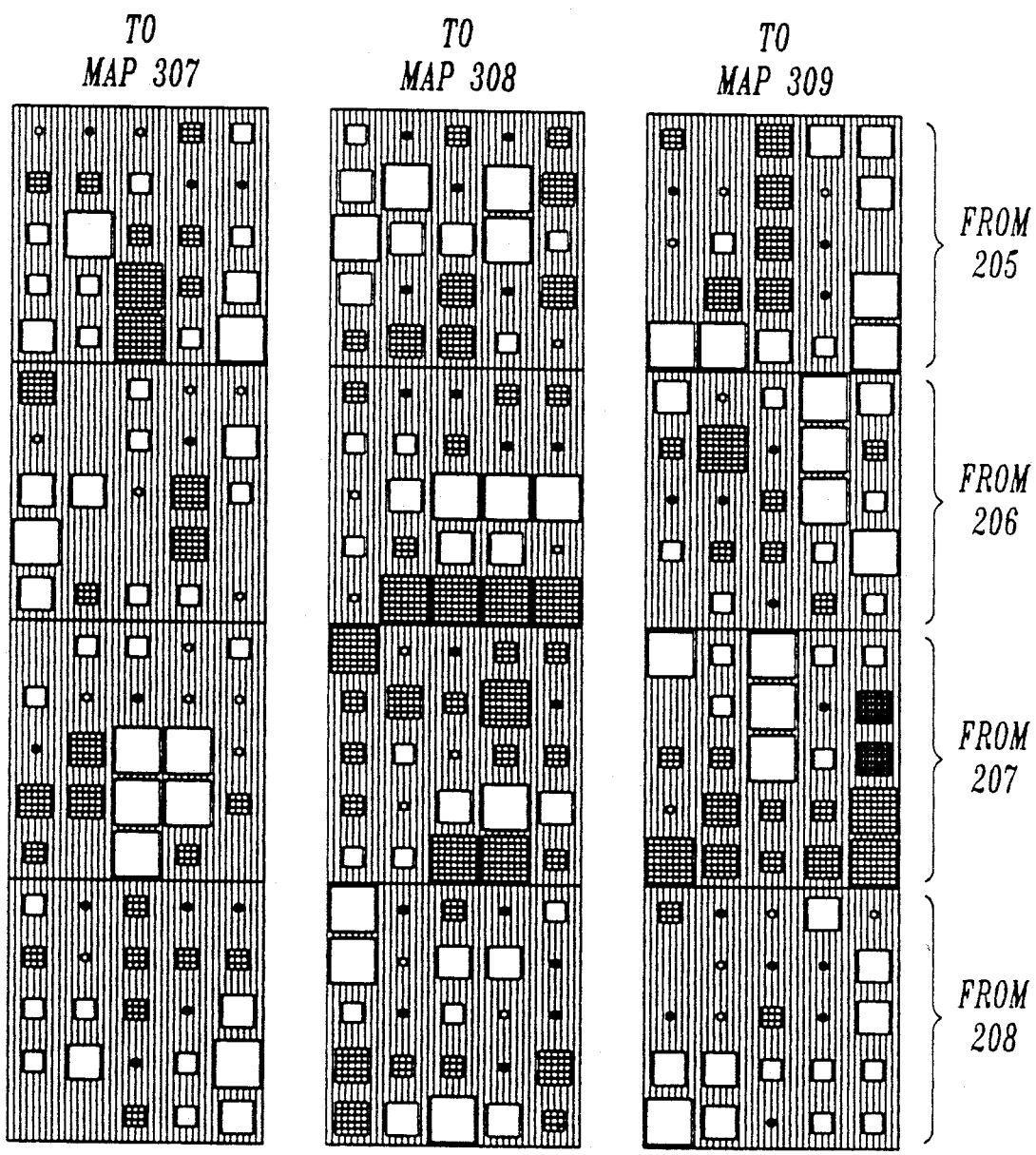
Figure 15:
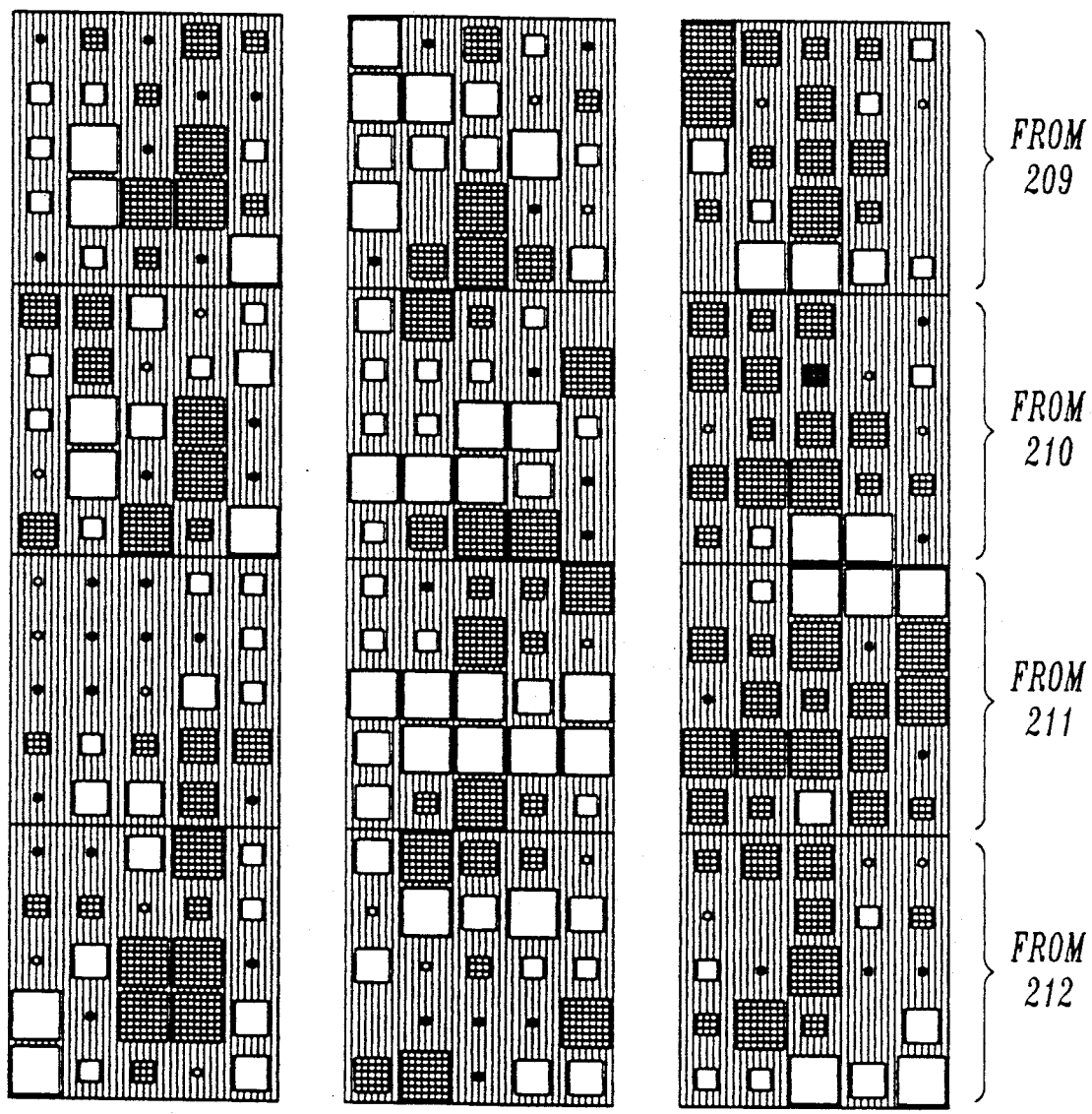
Figure 17:
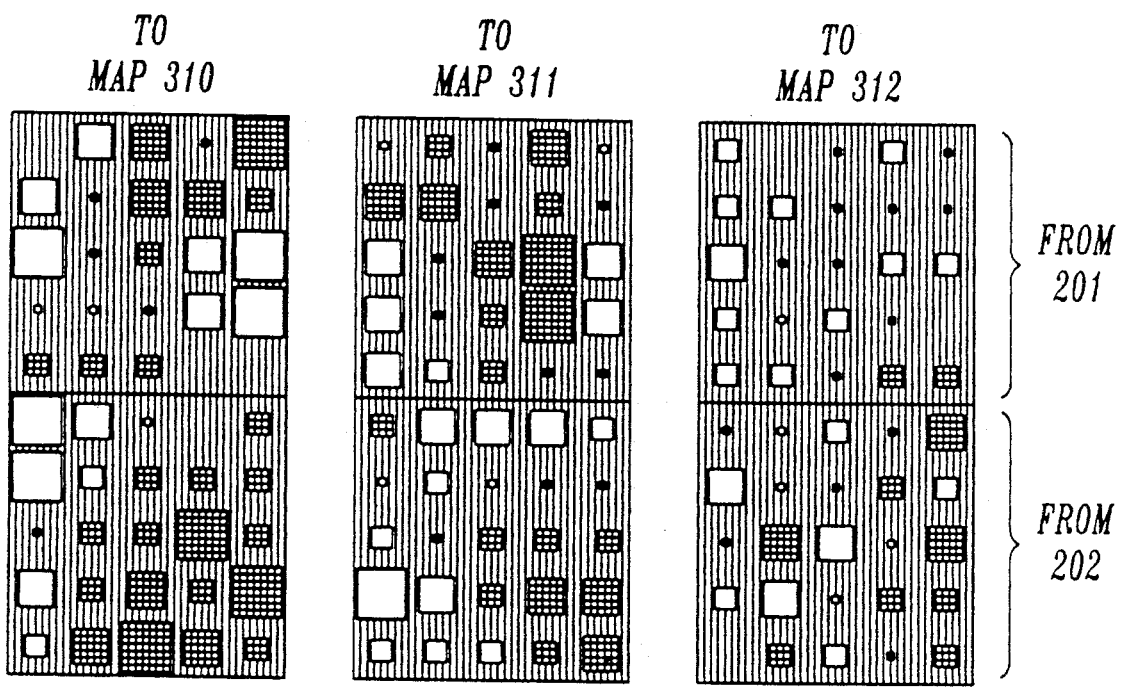
Figure 18:
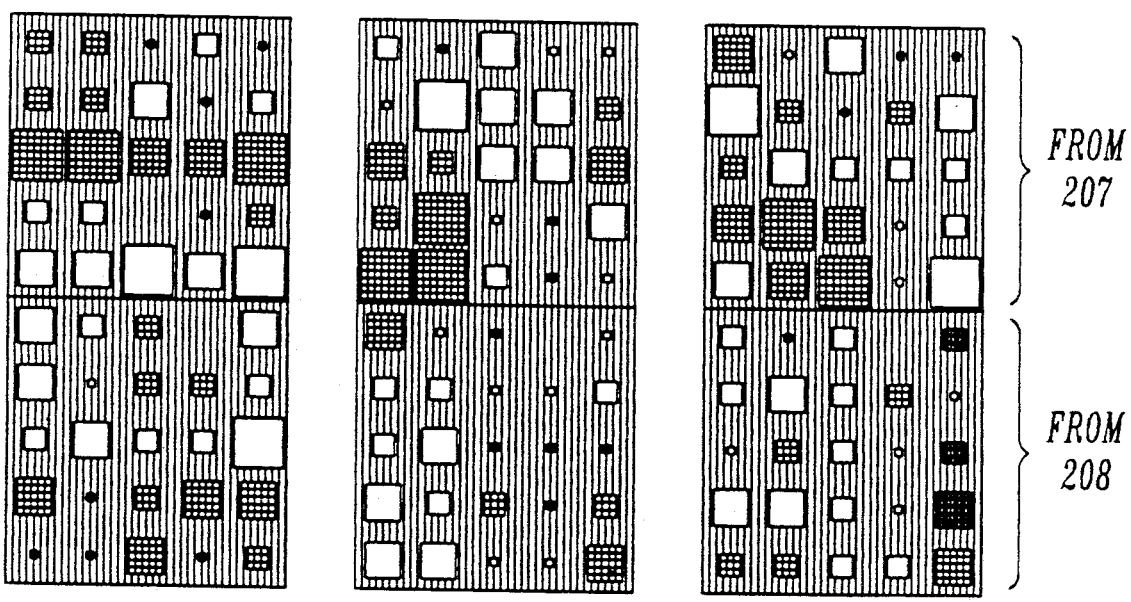
Figure 19:
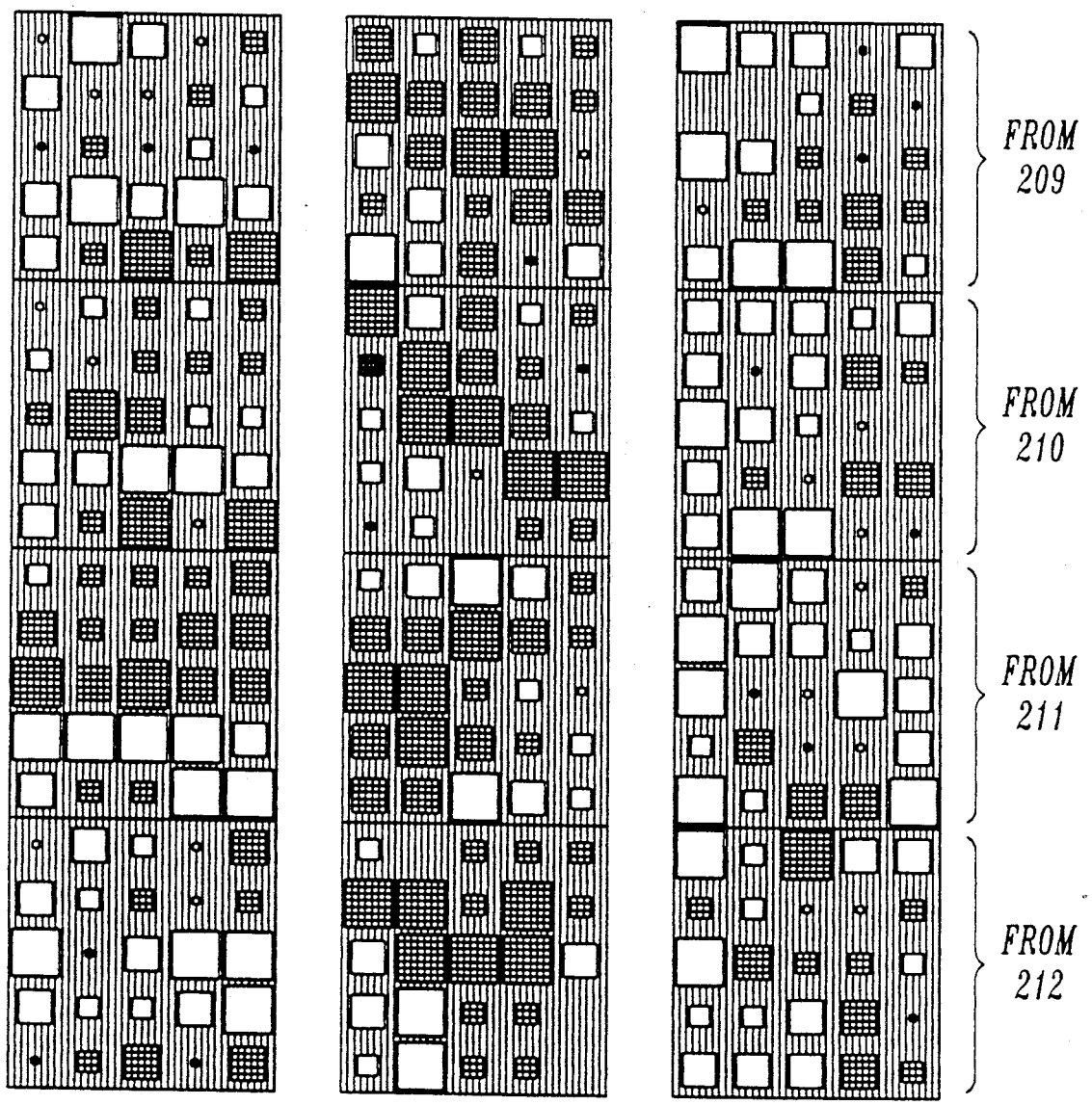

Interconnection lines from layer to layer in the network shown in FIG. 2 have been drawn to show which maps in a preceding layer provide inputs to each and every computation element whose units form the maps in the next higher network layer of interest. For example, constrained feature maps 201 through 212 detect different features from image 10 in the process of generating the constrained feature maps. Proceeding to the next level of maps, feature reduction maps 301 through 312 derive their input from the units in combinations of eight different constrained feature maps 201 through 212. Constrained feature maps 301, 302 and 303 derive their inputs from combinations of units in constrained feature maps 201, 202, 203, 204, 209, 210, 211, and 212 using exemplary kernels from FIG. 5; constrained feature maps 304, 305, and 306 derive their inputs from combinations of units from constrained feature maps 203, 204, 205, 206, 209, 210, 211, and 212 using exemplary kernels from FIG. 6; constrained feature maps 307, 308, and 309 derive their inputs from combinations of units from constrained feature maps 205 through 212, inclusively, using exemplary kernels from FIG. 7; and constrained feature maps 310, 311, and 312 derive their inputs from combinations of units from constrained feature maps 201, 202, and 207 through 212, inclusively, using exemplary kernels from FIG. 8. Exemplary kernels used for weighting the interconnections between image 10 and layer 20 are shown in FIG. 4.

Dimensionality reduction layer 40 includes more elements than are in the classification layer 50. As shown in FIG. 2 for an exemplary number recognition network, there are 30 units or elements shown in layer 40. It should be noted that the character classification layer 50 includes a sufficient number of elements for the particular character recognition problem being solved by the network. That is, for the recognition of either upper case or lower case Latin alphabetic characters, one exemplary embodiment of layer 50 would include 26 units signifying the letters A through Z or a through z, respectively. On the other hand, for the recognition of numeric characters, one embodiment of layer 50 would include only 10 units signifying the numbers 0 through 9, respectively.

For convenience and ease of understanding, the bias input to the computational element and its associated weight in the kernel shown in FIG. 1 have been omitted from FIGS. 3 through 8 and in the description herein. In experimental practice, the bias is set to 1 and its corresponding weight in the kernel is learned through back propagation although the kernel element for the bias input is not shown in any of the FIGS.

Layer 20 is composed of 12 groups of 64 units arranged as 12 independent 8 by 8 feature maps. These twelve feature maps will be designated as map 201, map 202, ..., map 212. Each unit in a feature map takes input from a 5 by 5 neighborhood on the input plane. For units in layer 20 that are one unit apart, their receptive fields (in the input layer) are two pixels apart. Thus, the input image is *undersampled* and some position information is eliminated in the process. A similar two-to-one undersampling occurs going from layer layer 20 to layer 30.

This design is motivated by the consideration that high resolution may be needed to detect whether a feature of a certain shape appears in an image, while the exact position where that feature appears need not be determined with equally high precision. It is also known that the types of features that are important at one place in the image are likely to be important in other places.

Therefore, corresponding connections on each unit in a given feature map are constrained to have the same weights. In other words, all of the 64 units in layer 201 uses the same set of 25 weights. Each unit performs the same operation on corresponding parts of the image. The function performed by a feature map can thus be interpreted as a generalized convolution with a 5 by 5 kernel.

Of course, units in another map (e.g., map 204) share another set of 25 weights. It is worth mentioning that units do not share their biases (thresholds). Each unit thus has 25 input lines plus a bias. Connections extending past the boundaries of the input take their input from a virtual back-ground plane whose state is equal to a constant, pre-determined background level, in our case −1. Thus, layer 20 comprises 768 units (8 by 8 times 12), 19968 connections (768 times 26), but only 1068 free parameters (768 biases plus 25 times 12 feature kernels) since many connections share the same weight.

Layer 30 is also composed of 12 features maps. Each feature map contains 16 units arranged in a 4 by 4 plane. As before, these feature maps will be designated as map 301, map 302, ..., map 312. The connection scheme between layer 20 and layer 30 is quite similar to the one between the input and layer 20, but slightly more complicated because layer 20 has multiple 2-D maps. Each unit in layer 30 combines local information coming from 8 of the 12 different feature maps in layer 20. Its receptive field is composed of eight 5 by 5 neighborhoods centered around units that are at identical positions within each of the eight maps. Thus, a unit in layer 30 has 200 inputs, 200 weights, and a bias. Of course, all units in a given map are constrained to have identical weight vectors. The eight maps in layer 20 on which a map in layer 30 takes its inputs are chosen according to the following scheme. There are four maps in the first hidden layer (namely layer 209 to layer 212) that are connected to all maps in the next layer and are expected to compute coarsely-tuned features. Connections between the remaining eight maps and layer 30 are as shown in the FIGS. 5 through 8. The idea behind this scheme is to introduce a notion of functional contiguity between the eight maps. Because of this architecture, layer 30 units in consecutive maps receive similar error signals, and are expected to perform similar operations. As in the case of layer 20, connections falling off the boundaries of layer 30 maps take their input from a virtual plane whose state is constant equal to 0. To summarize, layer 30 contains 192 units (12 times 4 by 4) and there is total of 38592 connections between layers layer 20 and layer 30 (192 units times 201 input lines). All these connections are controlled by only 2592 free parameters (12 feature maps times 200 weights plus 192 biases).

Layer 40 has 30 units, and is fully connected to layer 30. The number of connections between layer 30 and layer 40 is thus 5790 (30 times 192 plus 30 biases). The output layer has 10 units and is also fully connected to layer 40, adding another 310 weights. The network has 1256 units, 64660 connections and 9760 independent parameters.

Figure 3:
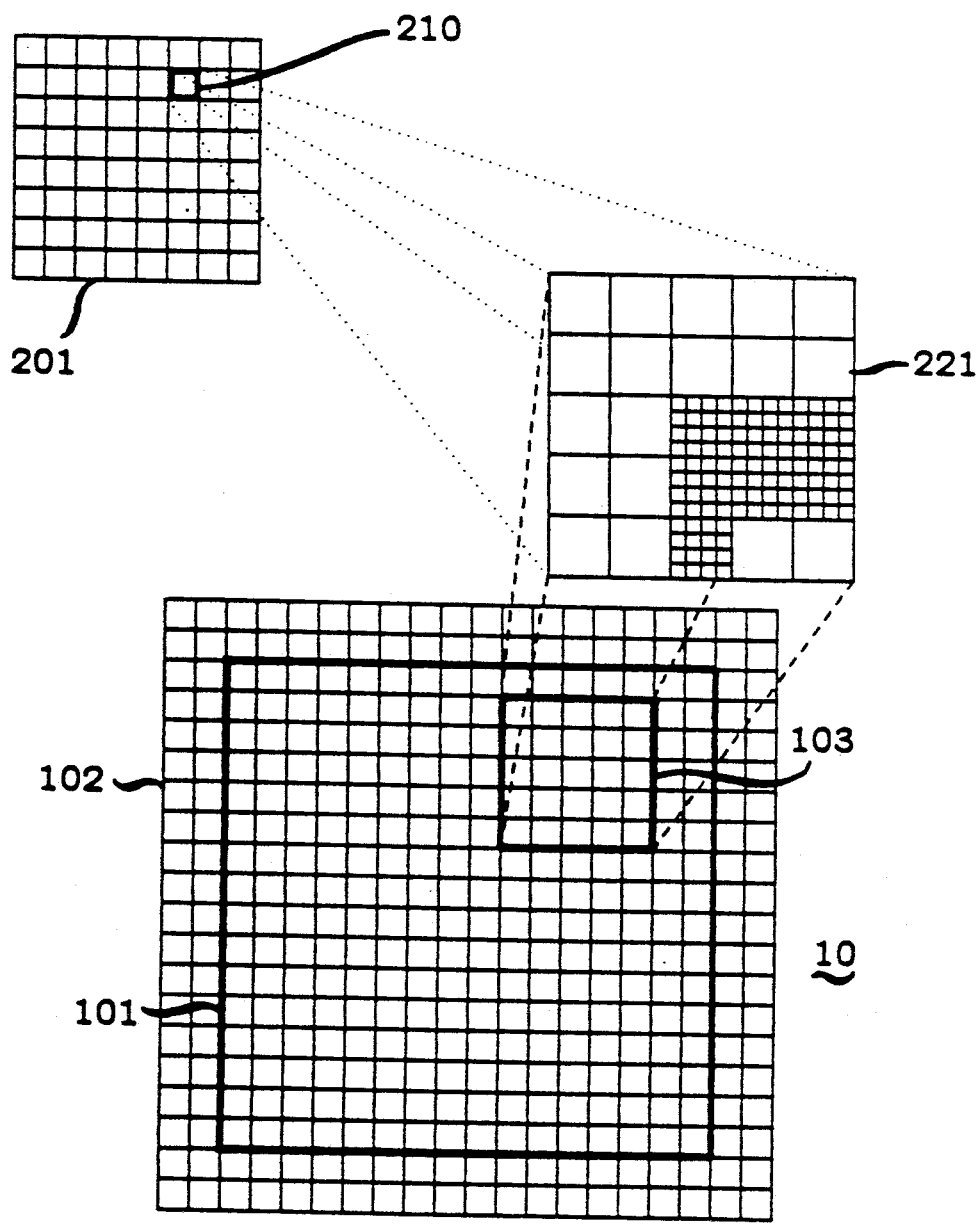
FIG. 3 is simplified diagram showing the connective relationship between units in a map at one level with a unit in a map at the next higher adjacent level.

FIG. 3 shows sample interconnections and feature extraction and detection from image 10 to constrained feature map 201. Unit 210 in map 201 observes a $5 \times 5$ neighborhood on the input image plane and uses weights from an exemplary kernel 221 in FIG. 4 to develop the value of unit 210. The gray scale unit value shows the presence, substantial presence, substantial absence, or absence of that feature in the input image in that neighborhood. The function performed by each computational element in the constrained feature map is interpreted as a nonlinear convolution of a $5 \times 5$ receptive field of image pixels or units with a $5 \times 5$ kernel. For units (computation elements) that are one unit apart in map 201, their receptive fields in the input image layer are two pixels apart. Other units in constrained feature map 201 use the same kernel as used by unit 210. Other maps in layer 20 include units which operate on the image in a manner identical to map 201 using different kernels from that shown in FIG. 3. See FIG. 4 for differences in exemplary kernels for the associated constrained feature maps in layer 20.

As shown in FIG. 3, image 10 includes a $16 \times 16$ array 101 comprising an image of the original character surrounded by a constant-valued border which is 2 pixels wide resulting in a $18 \times 18$ image array 102. Constrained feature map 201 is shown as a $8 \times 8$ array.

Interconnection from constrained feature maps in layer 20 to units in constrained feature maps of layer 30 are not shown because of complexity of the drawing. The interconnections are similar to the one shown in FIG. 3 with the addition of interconnections from other feature maps to determine a specific unit value. Functionally, this interconnection is a nonlinear convolution with several $5 \times 5$ kernel (see FIGS. 5 through 8). All other interconnections between the first and second feature detection layers result in a nonlinear convolution using a composite kernel or two separate kernels (such as two $5 \times 5$ kernels) on a composite array of units from similar (e.g., 5×5) receptive fields on eight different feature reduction maps. As contemplated for the network shown in FIG. 2, maps 301 through 312 are 12×12 arrays.

FIG. 4 through 8 show an exemplary set of kernels learned for the network shown in FIG. 2. The kernels are used by the computational elements for constrained feature maps in the first and second feature detection layers. Increased brightness levels for the individual squares indicate more positive analog (gray level) values for the weights in the kernel. Increased darkness levels for the individual squares indicate more negative analog (gray level) values for the weights in the kernel. Kernels 221 through 232 are used on image 10 to produce constrained feature maps 201 through 212, respectively.

For the exemplary network embodiment shown in FIGS. 2 through 8, it has been estimated that there are approximately 65,000 connections and only approximately 10,000 free parameters. It should be noted that the network architecture and constraints on the weights have been designed to incorporate sufficient knowledge of the geometric topology of the recognition task.

It should be clear to those skilled in the art that constrained feature map sizes, dimensionality reduction layer sizes, receptive fields, kernel sizes and array sizes may be changed without departing from the spirit and scope of this invention. Moreover, it should also be clear to those skilled in the art that other sets of alphabetic and alphanumeric characters can be recognized with only slight adjustments to the network architecture.

We claim:

1. A massively parallel computation network for recognition of a character included in an image map, said network including a first constrained feature detection layer for extracting features from said image map and for undersampling said image, a second constrained feature detection layer for extracting features from said first constrained feature detection layer and for undersampling said first feature detection layer, first dimensionality reduction layer substantially fully connected to and responsive to said second constrained feature detection layer, and second dimensionality reduction layer substantially fully connected to and responsive to said first dimensionality reduction layer for classifying the character recognized by the network and generating an indication representative of the character recognized by the network.

2. The computation network defined in claim 1 wherein said image map includes a substantially constant predetermined background surrounding an original character image.

3. The computation network defined in claim 1 wherein said first constrained feature detection layer includes M groups of m units arranged as independent feature maps and said second constrained feature detection layer includes N groups of n units arranged as independent feature maps, and M, N, m, and n are positive integers where M≧N and m≧n.

4. The computation network defined in claim 3 wherein N and M are equal.

5. The computation network as defined in claim 3 wherein said first dimensionality reduction layer comprises L groups of one unit each, said second dimensionality reduction layer comprises K groups of one unit each, where K and L are positive integers and K is greater than N and less than L.

6. The computation network defined in claim 5 wherein N and M are equal.

7. The computation network defined in claim 3 wherein substantially each unit has associated therewith a corresponding computational element for generating a value for the associated unit, each said computational element having a weighting kernel associated therewith and being responsive to a plurality of substantially neighboring units from at least a predetermined other layer for mapping a dot product of said associated weighting kernel with said predetermined plurality of substantially neighboring units into an output value in accordance with a selected nonlinear criterion, each said computation element responsive to a different plurality of substantially neighboring units than each other computation element associated with the same map, said first constrained feature detection layer responsive to image units, said second constrained feature detection layer responsive to units responsive to units from at least one feature map in said first constrained feature detection layer, each unit in said first dimensionality reduction layer responsive to substantially every unit in said second constrained feature detection layer representative of the character recognized by the network, and each unit in said second dimensionality reduction layer responsive to substantially every unit in said first dimensionality reduction layer.

8. The computation network defined in claim 7 wherein the selected nonlinear criterion includes a sigmoidal function.

9. The computation network defined in claim 7 wherein the selected nonlinear criterion includes a piecewise nonlinear function.

10. The computation network defined in claim 7 wherein N and M are equal.

11. The computation network as defined in claim 7 wherein said first dimensionality reduction layer comprises L groups of one unit each, said second dimensionality reduction layer comprises K groups of one unit each, where K and L are positive integers and K is greater than N and less than L.

12. The computation network defined in claim 11 wherein N and M are equal.

13. The computation network defined in claim 12 wherein the selected nonlinear criterion includes a sigmoidal function.

14. The computation network defined in claim 12 wherein the selected nonlinear criterion includes a piecewise nonlinear function.

* * * * *